United States Patent

Bauer

[11] Patent Number: 5,609,815
[45] Date of Patent: Mar. 11, 1997

[54] PROCESS FOR FAST MANUFACTURING OF CARBONACEOUS PRODUCTS

[75] Inventor: Jean-Michel Bauer, Pagny sur Moselle, France

[73] Assignee: Le Carbone Lorraine, Courbevoie, France

[21] Appl. No.: 436,641

[22] Filed: May 8, 1995

Related U.S. Application Data

[63] Continuation of Ser. No. 198,783, Feb. 18, 1994, abandoned.

[30] Foreign Application Priority Data

Feb. 23, 1993 [FR] France .................................. 93 02346

[51] Int. Cl.$^6$ ..................................... B29C 35/12
[52] U.S. Cl. ................... 264/414; 264/430; 264/431; 264/434; 264/486; 264/29.5; 264/29.6; 264/29.7; 264/40.6; 264/81; 423/445 R; 423/448; 423/460; 427/113; 427/227; 427/249
[58] Field of Search ................... 264/29.5, 29.6, 264/29.7, 414, 430–431, 434, 486, 40.6, 81

[56] References Cited

U.S. PATENT DOCUMENTS

| | | | |
|---|---|---|---|
| 3,405,205 | 10/1968 | Rowe et al. | 264/29.1 |
| 3,619,430 | 11/1971 | Hiratsuka | 264/29.1 |
| 3,849,332 | 11/1974 | Bailey et al. | 264/29.6 |
| 3,907,950 | 9/1975 | Bickerdike et al. | 264/29 |
| 3,955,256 | 5/1976 | Park | 28/72 R |
| 4,185,055 | 1/1980 | Barrilon et al. | 264/29.5 |
| 4,221,773 | 9/1980 | Tsukagoshi et al. | 423/445 |
| 4,581,263 | 4/1986 | Lukas | 428/36 |
| 4,606,529 | 8/1986 | Tooch | 266/80 |

FOREIGN PATENT DOCUMENTS

| | | | |
|---|---|---|---|
| 1160183 | 6/1958 | France . | |
| 2240416 | 3/1977 | France . | |
| 58-213610 | 12/1983 | Japan | 264/29.6 |
| 60-54909 | 3/1985 | Japan | 264/29.6 |
| 61-158808 | 12/1986 | Japan . | |

*Primary Examiner*—Jeffery R. Thurlow
*Attorney, Agent, or Firm*—Dennison, Meserole, Pollack & Schmeiner

[57] ABSTRACT

A process for manufacturing carbonaceous parts including the steps of shaping a mixture of carbonaceous powder and bonding agent to form raw parts, cooling the raw parts to ambient temperature at a known rate and firing the cooled parts in a furnace from ambient temperature to a final firing temperature to release volatile particles to produce fired parts devoid of volatile products. This process is improved by placing the raw parts in an electric furnace in the absence of heating filler, heating the raw parts in the furnace to an intermediate temperature of about 200° C. at a fixed initial heating rate such that the loss of volatile products is less than 10% by weight of the total amount of volatile products contained in the raw parts and being a function of the cooling rate such that the internal strain from the shaping and cooling step is freed. The raw parts are then heated from the intermediate temperature to the final firing temperature, both heating steps taking place under a flow of non-oxidizing gas in the electric furnace to reduce the partial pressure of the volatile products near the surface of the parts, the gas flow compensating for loss of the volatile products.

16 Claims, 3 Drawing Sheets

PROCESS FOR FAST MANUFACTURING OF CARBONACEOUS PRODUCTS

This is a continuation of application Ser. No. 08/198,783 filed on Feb. 18, 1994 now abandoned.

DOMAIN OF THE INVENTION

The invention is concerned with manufacturing carbonaceous products.

PRIOR ART

Usually, the manufacture of carbonaceous pieces or products comprises the following steps:

a) a step for preparing a crude piece which consists in shaping a paste based on a carbon power and a bonding agent, typically pitch or tar, or a resin. The shaping operation, which is typically carried out by extrusion or compression, makes it possible for a piece to be obtained which has the basic shape and dimensions of the finished piece to be obtained.

b) a step for firing (carbonization) of the crude product in order to make it possible to obtain a piece of amorphous carbon said to be "hard". This firing operation is carried out by heating the crude piece from ambient temperature to 800° C., even 1300° C. It is accompanied by departure of the volatile products which have resulted from decomposition of the bonding agent (debonding phase).

A fire piece is thus obtained of "hard" and porous carbon.

Depending on the final properties sought for the end carbonaceous piece, these basic steps can be followed by complementary steps which are intended to transform the fired piece (made of hard carbon) into a "soft" graphite piece by way of a process known as a graphiting process (step c, optional), and/or to densify the carbonaceous product, whether it be in "hard" carbon form or in "soft" graphite form by way of a process known as a densification process (step d, optional).

A typical graphiting process consists in bringing a fired piece of "hard" carbon (porous or otherwise) to a temperature which is greater than 2000° C. and usually in the order of 2800° C. to have a graphiting speed which is sufficiently compatible with an industrial process.

Typical densification processes comprise either incorporating pressurised liquid resin followed by a firing operation (usually a densification process of this kind comprises several successive cycles for incorporating the liquid resin and for firing), or chemical deposition in vapor phase (CDVP), typically by the cracking of a gas with a high carbon content at temperatures which are usually between 900° and 1800° C.

Finally, by way illustration, the carbonaceous pieces obtained can be either of (hard) carbon, or (soft) graphite, depending on the allotropic variety of the chemical element C, or porous, or not very porous or not porous at all, depending on the density of the end carbonaceous product.

As far as the industrial technique is concerned which is already known for implementation of these various steps, it should be noted generically that heat treatment of carbon requires operation in a non-oxidizing atmosphere to avoid combustion of the element C.

The technique which is used, in particular for the firing step b), consists in placing the pieces to be fired (crude pieces) either directly into furnaces or into crucibles intended to be placed in a furnace, and in protecting the pieces from oxidation by coating them with a carbon powder known as a "heating filler".

The furnaces which are heated with gas or fuel oil vary in type (rotating firing furnaces, chamber furnaces, tunnel furnaces, "batch" furnaces . . . ). They permit a maximum temperature of 1300° C. to be obtained.

Typically, in the firing step, the pieces to be fired are brought to a temperature of 850° C. and the duration of this step is basically the same as that of the temperature increase.

In the case of an industrial furnace with a capacity of 100m$^3$, this rise typically lasts from several days to a few weeks depending on the size and formulation of the pieces to be fired. A standard diagram for "temperature °C.—time h" corresponding to this firing step is shown in FIG. 1.

Any acceleration in the heating speed results in the formation of defective pieces, typically manifested by cracks or ruptures.

The graphiting technique (step c) calls upon the electrical properties of the carbon: the fired pieces to be graphited are heated by direct passage of an electrical current in a stack of the pieces, after they have been protected by the carbonaceous powder which is currently done in an Acheson® resistance heating furnace.

Thus, the firing and graphiting operations are usually separate, call upon different techniques and therefore require that the pieces to be treated be transferred to different furnaces.

However, as described in the Patent Application JP-A-61 158 808, it is also possible to use an induction furnace to fire and then to graphite a carbonaceous piece in one and the same furnace, in the case of crude products which have a very low content of volatile materials.

Moreover, of the densification techniques (step d), the CDVP technique requires furnaces under vacuum, which, at about 1000° C., make it possible for a relatively low partial pressure of the cracking gas to be obtained in the order of 2 kPa (20 millibar).

This operation is usually carried out on pieces which have already been graphited, and which have therefore already finally retreated.

Problems Solved

With regard to the manufacture of carbonaceous pieces (of carbon or graphite with varying degrees of porosity), the skilled person has hitherto been unable to overcome two problems, firstly the slow speed of the manufacturing cycles (the total duration of one complete shaping/firing/graphiting/densification cycle takes month—typically between 1 and 4 months), and secondly the need to have a number of special pieces of equipment for each step of the process.

The duration of an operation and the investment costs, or the pieces of equipment needed to implement such an operation are very major in terms of cost (productivity, profitability of the capital invested, rapidity of response to customer demand, etc . . . ).

Progress has already been made thanks to the teaching of the patent FR 2 153 800 in instances where the pieces are solid pieces (in the order of 100 kg and about 40 cm in thickness) of carbonaceous products, large sized pieces such as electrodes used for manufacturing aluminium which can be fired quickly after the temperature within the product has been brought to between 120° and 170° C.

This progress has not been made with the products under examination by the Applicant, mainly carbonaceous pieces for chemical engineering (examples according to the invention=tube, 6 mm thick). However, even if progress had been able to be made, it would have only slightly solved problems which still remain, typically:

- too long a duration of production cycles and low flexibility of production,
- the need for a large range of pieces of heavy and expensive equipment to form all the variants required of carbonaceous products,
- high production cost and high cost of the materials linked with the presence of a heating filler in a number of processes.

The Applicant has sought ways of solving all these problems simulataneously in order to greatly improve the profitability of these processes for manufacturing carbonaceous pieces.

DESCRIPTION OF INVENTION

According to the invention the process for manufacturing carbonaceous pieces comprises a step a) for manufacturing crude carbonaceous pieces which are typically obtained by heat shaping a mixture of carbonaceous powder and a bonding agent followed by a cooling operation, at ambient temperature, of said carbonaceous pieces formed, a step b) for firing said crude carbonaceous pieces in a furnace which comprises an increase in temperature of said crude carbonaceous pieces from ambient temperature to a temperature which can be as high as 1300° C., in such a way as to bring about the department of volatile products and in such a way as to obtain crude carbonaceous pieces which have no volatile products, and is characterized in that in order to increase the speed of said temperature increase in step b) for firing, 1) said crude carbonaceous pieces are first of all placed (without heating filler) in an electrical heating furnace and 2) secondly, a heating speed is selected for said pieces up to 200° C., prior to any significant departure of said volatile products (<10% of volatile products), as a function of the speed of said cooling operation in step a), an increase to said heating speed corresponding to a reduction in the cooling speed in step a), in such a way that the stresses resulting from step a) are freed, and 3) finally, said temperature rise is carried out by circulating a non-oxidizing gaseous atmosphere (gaseous sweeping flow) which surrounds said crude carbonaceous pieces, by locally reducing the partial pressure into the volatile products.

Faced with the problem which is posed by the long duration of prior art heat treatments (firing, densification, graphiting treatments) with the manufacture of carbonaceous materials, the Applicant has demonstrated that contrary to customary practice by the skilled person fast heat treatments were possible for the entire range of treatments (from ambient temperature to the graphiting temperature of about 2800° C.).

The ratio of the durations of the treatment according to the invention and according to the prior art is typically a ratio of 1 to 10 which is considerable, and of utmost importance in economical terms.

To that end, the Applicant has discovered that it was necessary to combine three means A) the first means is constituted by the use of an electric furnace without any heating filler, a single heating means, even for firing crude carbonaceous pieces which constitute "greasy" products, that is to say products which typically contain more than 20% by weight of carbonaceous bonding agent, most frequency a pitch which typically results in the formation of at least 10% of volatile materials.

Despite the fact that the use of an electrical furnace is already known per se for heat treatment of carbonaceous pieces (without volatile materials—or with heating filler if the volatile materials have departed), since the usefulness of this type of furnace is linked, amongst other things, to the available heating power and to ease of control, the Applicant has nonetheless discovered conditions which permit the use of an electric furnace without heating filler, even for firing carbonaceous pieces with a high content of pitch (up to 50% of pitch by weight).

In fact, one problem to be resolved is the "clean" elimination of volatile materials during the debonding phase, that is to say eliminating them without polluting the furnace itself. There would be no point in obtaining a fast heat treatment if a large amount of time then had to be spent on cleaning the furnace.

Now, without a heating filler, the risk of having some areas of the furnace polluted was too great. The Applicant surprisingly noted that thanks to the conditions according to the invention, particularly a third means to be described hereinbelow, the problem was resolved.

B) According to the second means of the invention, within a temperature range going from the ordinary temperature to the temperature (typically 200° C.) at the start of significant departure of volatile products (or debonding) a heating speed had to be selected for the crude carbonaceous pieces as a function of the cooling speed of the carbonaceous pieces after heat shaping in step a), in such a way as to free, prior to debonding, the internal stresses of the crude carbonaceous pieces, which stresses, according to studies carried out by the Applicant, tend to be caused by the cooling speed much more than by the actual shaping operation of the crude carbonaceous pieces.

According to the invention, it is thus possible, by selecting a low cooling speed in step a) to increase the heating speed at the start of step b), and thus to optimise the production costs in consideration of the respective cost of equipment for each step.

Thus, the heating speed to 200° C. will be much faster if cooling of the crude carbonaceous piece takes place in ambient air (preferable according to the invention) rather than in water.

Generally speaking, the mechanical stresses of the carbonaceous pieces are freed prior to the departure of said volatile products by selecting a heating speed for said crude carbonaceous pieces which is less than 100° C./h to a temperature of 200° C. which becomes as the cooling speed of the crude carbonaceous pieces increases in step a).

It should be noted that in the particular case of carbonaceous pieces which are of low thickness, such as the tubes described in the examples, the teaching of the patent FR 2 153 800 is ineffectual. In fact, the Applicant has noted that in such a case in order to obtain clean end pieces (without physical defects) it was not sufficient to bring the temperature within the crude carbonaceous piece to between 120° and 170° prior to quickly bring the piece to the highest temperature. Following the work undertaken, the Applicant succeeded in providing the essential role of the cooling stage in step a) on the fast heating possibilities before 200° C. in step b). Thus, at least for carbonaceous products with thin walls, the heating criterium at the heart of FR2153800 was not pertinent, despite the fact that the internal stresses had to be relaxed in every case.

C) With the third means of the invention, once the stresses have been relaxed, it is possible, during the firing step (debonding phase), to perform rapid and "clean" departure of the volatile products by increasing the temperature of the pieces to be fired, without any heating filler, by circulating a non-oxidizing gaseous atmosphere in such a way as to draw off the volatile products and to reduce the partial pressure of these products.

In the gaseous atmosphere surrounding the pieces to be fired, during the firing operation it is preferable if the ratio of "mass of volatile products/mass of gas of said non-oxidizing atmosphere" is less than 3 and preferably less than 1. If the ratio is too high, total or partial loss is to be seen of the mechanical properties of the fired pieces. If the ratio is too low, there is, in particular, excessive and impractical consumption of the gases of which the non-oxidizing gaseous atmosphere is composed. In practice, this ratio is usually above 0.5.

It can be advantageous to carry out the debonding stage at reduced pressure, the pressure (=partial pressure of the inert sweeping gas of which said non-oxidizing gaseous atmosphere is constituted+partial pressure of volatile materials) being typically less than 0.6 to 0.9 times the atmospheric pressure, thanks to a vacuum pump or an extractor (usually placed at the exit from an incinerator) which draws off the volatile materials to an incinerator for volatile materials.

Furthermore, the Applicant has demonstrated that all the main treatments which are carried out on crude carbonated pieces could be carried out, without any heating filler, in just one single furnace, namely an electrical furnace, and without any intermediate handling of the products to be treated.

The term, "main treatment" is used to refer to firing treatments which comprise a step for removing volatile products (debonding) to produce a porous material, densification treatments by CDVP of the porous material obtained after firing, treatments for changing the allotropic type such as graphiting a material which has been densified or not, by CDVP.

The process according to the invention is not restricted to these treatments. In particular, the process for densification by CDVP is not limited to deposition of carbon, usually pyrolytic carbon, but this is the most frequent densification treatment.

Finally, the Applicant has demonstrated that it was possible to associate quality of the pieces obtained with rapidity of the heat treatments, despite the fact that the skilled person has always associated quality of the pieces produced with slowness of the heat treatments.

From this curve and over this temperature range it is possible to work out the maximum flux $(F_M)$ and the average flux $(F_m)$ of volatile materials which expresses the percentage of total volatile material per hour.

Figure 5:
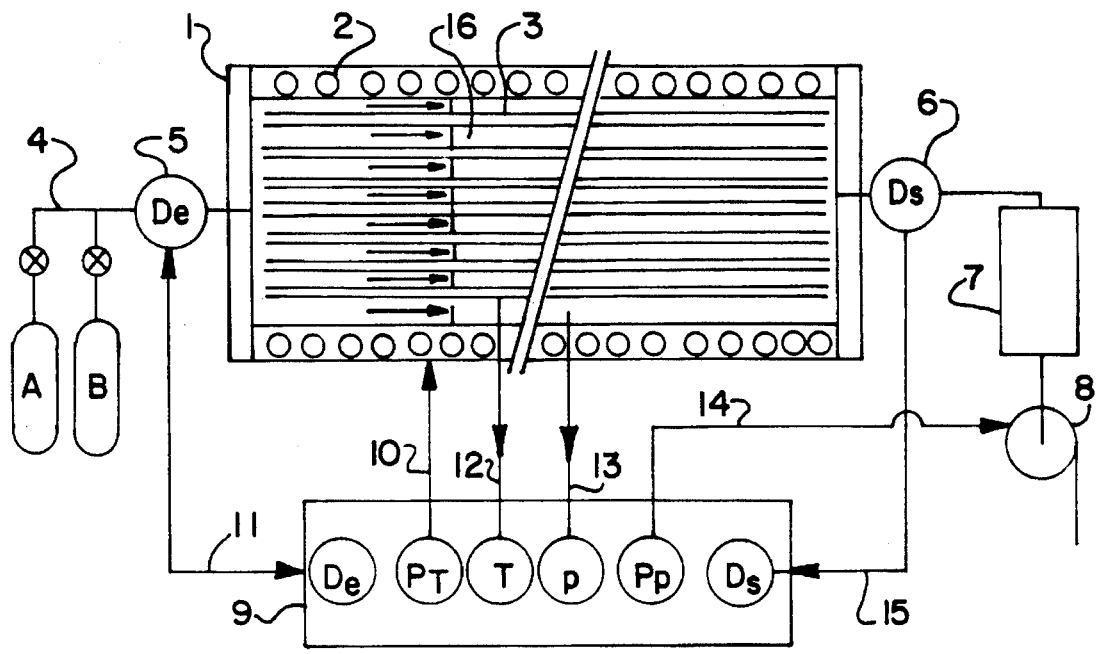

FIG. 5 illustrates (axial section for the furnace) the piece of equipment used to implement the invention. This piece of equipment comprises:

a) a tubular electrical furnace (1) comprising heating means (2) in which tubes (3) are placed which have no heating filler and which are made of a crude carbonaceous material so that axial circulation of inert gas around and inside each tube can take place. The advancing front (16) of the gaseous flux ("piston" flow type) is shown.

b) a supply of gases (4) (a gas A able to be the inert gas used during firing of the crude carbonaceous pieces, and a gas B being able to be the carbonaceous gas used for densification by CDVP) and means (5) for regulating the gaseous flow.

c) at the exit from the furnace, means for measuring the flow (6) of the gaseous flux leaving the furnace, and possibly other means such as an incineration furnace (7) and a vacuum pump (8).

d) means for controlling, monitoring and regulating (9) the process, with typically:

means (10) for controlling the heating capacity of the furnace (1), means (11) for measuring and controlling the gaseous flow at the intake De, means (12) for measuring the temperature of the tubes and the inside of the furnace, means (13) for measuring the pressure inside the furnace, means (14) for controlling the vacuum pump (8), means (15) for measuring the gaseous flow at the exit Ds.

DETAILED DESCRIPTION OF THE INVENTION

According to the invention, for the purpose of realising the treatments to which the crude carbonaceous pieces are subjected use is made of an electric resistance or induction heating furnace.

The crude carbonaceous pieces are placed in these furnaces, without the addition of carbon powder (heating filler), and usually the pieces are kept slightly spaced apart in order to promote removal of the volatile products contained in said crude carbonaceous products.

To promote this removal, said non-oxidizing gaseous atmosphere circulates at the surface of said carbonaceous pieces (pieces not surrounded by heating filler) with a gaseous front which advances at least at the speed of 0.5 cm/min (piston type flow), preferably between 5 and 30 cm/min.

This non-oxidizing gaseous atmosphere is preferably selected from nitrogen, argon and helium.

As far as the second means of the invention is concerted, studies made by the Applicant have demonstrated that if the crude carbonaceous piece is cooled when it has come from the shaping operation by being soaked in water, the heating speed must not exceed 5° C./h for pieces which are not very solid and which are produced according to the invention, "not very solid" indicating that at least one dimension is less than 20 cm and preferably less than 5 cm.

On the other hand, if the crude carbonaceous piece is cooled after coming from the shaping operation in air at ambient temperature, then a heating speed of 50° C./h to 100° C./h is possible.

If the heating speed used is up to 200° C. faster than the cooling speed in step a), then it is not possible to obtain end pieces of good quality (see example 5) by way of rapid heat treatment at a temperature of above 200° C.

The Applicant has, in particular, studied the firing kinetics in relation to debonding, and the means which are to be used in order for that step (which is, in practice, obligatory for all methods of manufacturing carbonaceous material), to give quality products. The Applicant has discovered that a means which permits reliable industrial production consisted in making the speed of said temperature increase be governed by the flux of volatile product which was set free, in such a way that a given flux was obtained.

In particular, said given flux was kept to between 5 and 65% of the total mass of volatile product/h and preferably between 20 and 40% of the total mass of volatile product/h.

Figure 4:
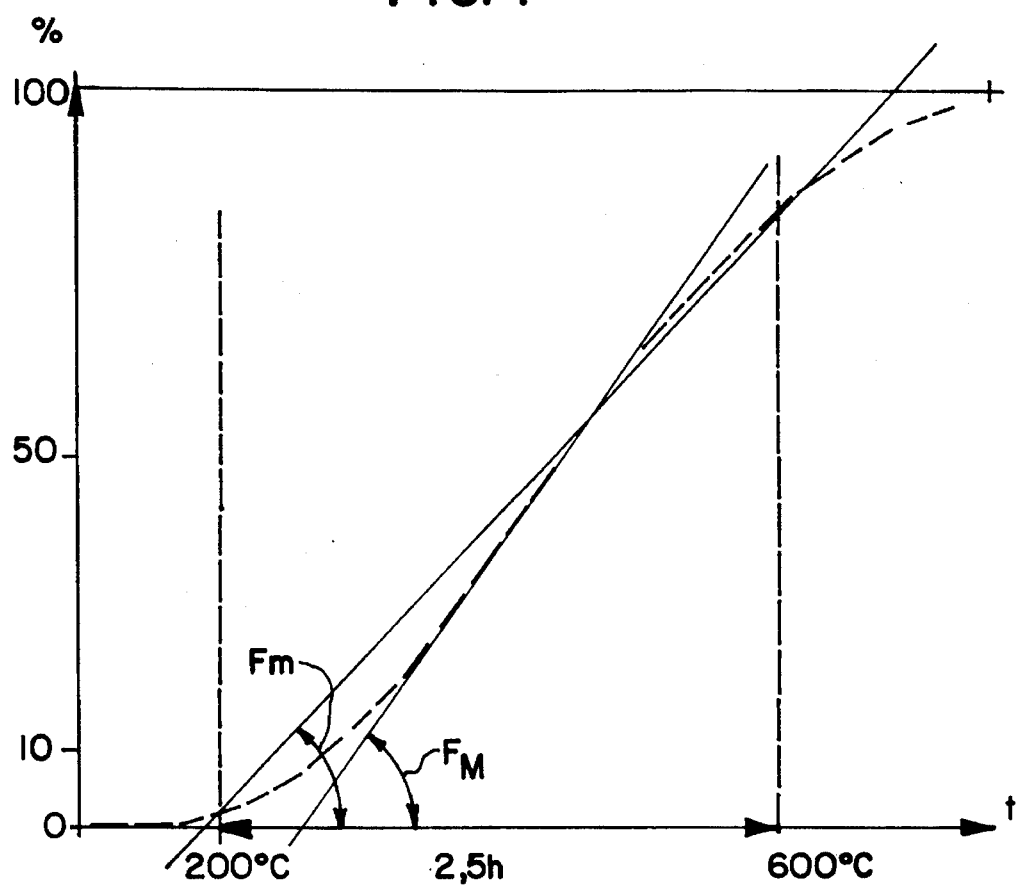
FIG. 4 shows a typical decoding curve between 200° and 600° C. (example 3). The y-axis gives, an accumulated values, the percentage of volatile material which has been eliminated, and the x-axis gives the time, a duration of 2.5 h corresponding to the temperature range of 200°–600° C.

These values were established on the basis of preliminary tests during which curves such as that shown in FIG. 4 were produced.

It is also possible to express said given flux, particularly in the temperature range (typically 200°–600° C.) where the flux is significant, by an average flux $F_m$ and/or a maximum flux $F_M$. Usually, the data means associated with the process permit a debonding curve to be stored, such as that in FIG. 4, and permit the firing operation to take place, in particular heating as a function of time to obtain the desired curve representative of debonding.

The process according to the invention can comprise just one firing or carbonization step which gives fired carbonaceous pieces, thereby permitting relatively light and porous pieces to be obtained.

However, the process is particularly advantageous when it further comprises a step d) for densification of the fired carbonaceous pieces and/or a step c) for graphiting.

In fact, as far as the step for graphiting the fired carbonaceous pieces is concerned, the step is carried out in one and the same furnace as that which was used in the firing step, without heating filler and in a non-oxidizing atmosphere (typically, an atmosphere of nitrogen or argon at atmospheric pressure or at reduced pressure or under vacuum) which surrounds said fired carbonaceous pieces, by bring said fired carbonaceous pieces (densified, or not by CDVP) to a temperature of at least 2300° C. at an increase speed of between 400° C./h and 1900° C./h, preferably close to 800° C./h.

Likewise, in the case of a densification step, step d) for densification by chemical deposition in vapor phase (CDVP) of the fired carbonaceous pieces is carried out in said same furnace by the cracking of a gas with a high carbon content (methane or natural gas) at reduced pressure at temperatures of between 800° and 1200° C. in such a way as to obtain dense carbonaceous pieces. It is therefore particularly advantageous to carry out the densification operation directly following the carbonization treatment, and preferably prior to a possible graphiting step, this being for two reasons:

firstly, by proceeding in such a way that the cost of densification is practically nil and is substantially reduced to a cost of material (gas with a high carbon content), this step being practically obscured by the increase in temperature from the temperature at the end of the firing operation to high graphiting temperatures.

secondly, by carrying out densification prior to the graphiting step, by densifying a piece prior to its finally being removed, this being done only after graphiting, so as to permit pieces of a particularly high density to be obtained, typically above 3% in relation to the density of a piece which has first of all been graphited and then densified.

However, in order to obtain maximum densification, it is advantageous to carry out a second densification by CDVP after the graphiting step, during cooling of said graphited piece in said same furnace.

Generally speaking, the invention makes it possible to obtain a wide variety of carbonaceous products which vary in terms of their density and their type, simply by combining the obligatory steps of the process (steps a and b) with a possible graphiting step (step c) and/or at least one densification step (step d) by using various processes according to the invention. These various processes can be designated symbolically by the succession of their steps (steps a, b, c and d having the same meaning as before): "ab", "abc", "abd", "abdc", "abcd" and "abdcd", the process "ab" producing the least dense product and the process "abdcd" producing the most dense product.

It is important to note that there is absolutely no handling of intermediate carbonaceous products in passing from one step to the next of the process, irrespective of the process selected, and this means that a very big saving is made on operating personnel.

Moreover, the process according to the invention permits automated realisation of the process. In fact, as illustrated by way of example in FIG. 5, it is advantageous to provide the furnace with means for regulating the supply of heating energy and thus for controlling temperature and heating speed of said carbonaceous pieces (crude or fired, graphited or not, dense or not) and means for regulating the gaseous sweeping flux in such a way as to control the type, pressure and flow of the gaseous atmosphere surrounding said carbonaceous pieces, and to thus be able to carry out steps b) and possibly step (s) c) and/or d) of said process automatically in accordance with prescribed requirements, (a step d)) preferably being carried out according to the invention before step c).

To that end, it is possible to first of all provide said furnace with means (captors) which make it possible for the flux of volatile product being released to be measured and means which make said gaseous sweeping product and said supply of heating energy to be governed by the flux in such a way as to keep the flux of volatile product released (amount of volatile product which is released per hour) to a given value.

Automated operation of this kind helps make the process according to the invention reliable and reproducible.

EXAMPLES

All the examples are given for industrial tests carried out on the same crude carbonaceous pieces.

To that end, tubes were shaped by mixing carbon powder and pitch and by heat extrusion and cooling in air at the exit from the extruder.

The crude tubes have the following dimensions:

Length: 4.5 m

External diameter: 37 mm

Internal diameter: 25 mm

Content of pitch: 28 to 30% by weight
Content by weight of volatile material: 14 to 15%

Example 1

This example corresponds to the prior art firing or carbonization step.

Figure 1:
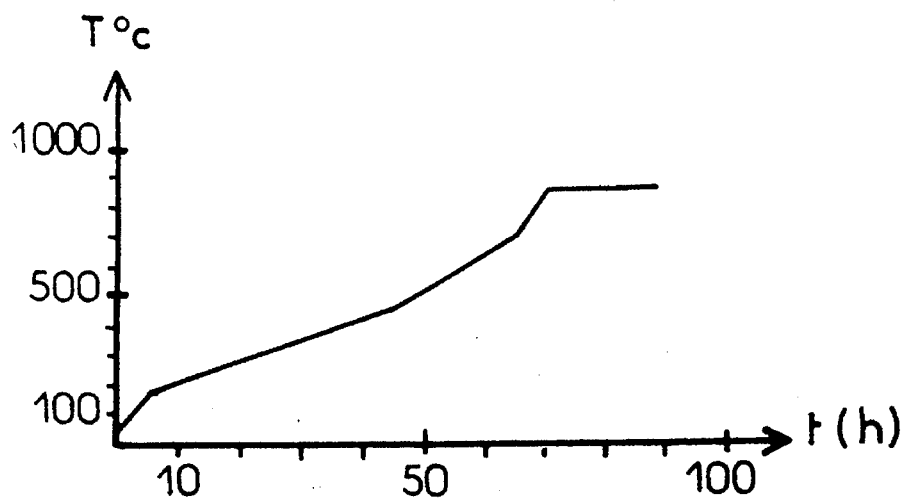
FIG. 1 is a diagram corresponding to a prior art firing treatment (example 1) which gives the temperature curve as a function of time. The temperature (T°C.) is given on the y-axis and the time (h) is given on the x-axis.

The crude tubes were placed in a Riedhammer® ring furnace and they were covered with a carbon powder which acted as a heating filler. The duration of the actual heating step (without change, cooling, unloading) and the temperature increase are given in FIG. 1 where it is possible to see that the duration of the heating step itself is 90 h.

However, overall, the entire step lasts 13 days (5 days for the firing operation and 8 days for the cooling operation).

Example 2

This example corresponds to the prior art graphiting step.

The Acheson® resistance heating type furnace was first of all assembled from graphite elements. The fired tubes were positioned by surrounding them with graphite powder. Duration: 8 hours.

The pieces to be graphited were brought to the graphiting temperature of 2800°–3000° C. Duration: 15 days. Duration of cooling operation: 15 days.

Total duration to obtain graphited tubes from the fired tubes: 38 days.

Example 3

This example according to the invention describes a heat treatment of the crude tubes which comprises a firing or carbonization step and a graphiting step.

The test was carried out on 160 tubes, that is to say on 800 kg of crude carbonaceous material.

In carrying out the test, the crude tubes were placed in a commercially available electrical (induction heating) furnace provided with means for sweeping with nitrogen, the tubes being spaced apart by blocks in such a way that their external surface is swept with nitrogen (non-oxidizing atmosphere), at least during the debonding step.

The furnace is cylindrical in shape, 5m in length and has a useful internal diameter of 80 cm, as illustrated in FIG. 5.

The sweeping of nitrogen (non-oxidizing atmosphere) from one end to the other of the cylindrical furnace corresponds to a front (16) which advances at a speed of 20 cm/min.

Figure 3:
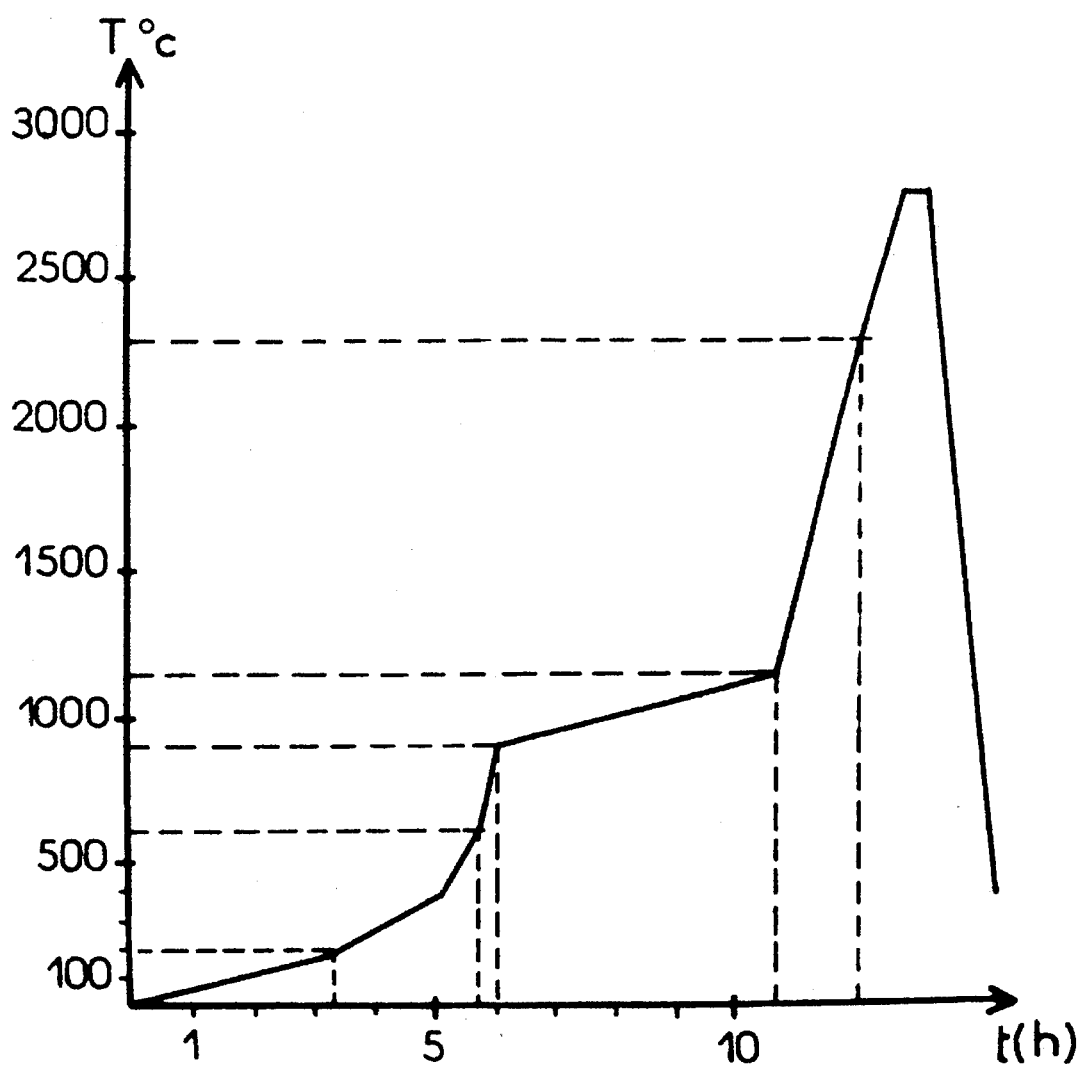
FIG. 3 is a diagram corresponding to an operation of firing and densification by CDVP and graphiting according to the invention (example 4) and giving the temperature curve as a function of time. The temperature (T°C.) is shown on the y-axis and the time (h) is shown on the x-axis.

The following heating speeds were imposed upon the carbonaceous tubes (see FIG. 3):

Step a): heating speed of 60° C./h to pass from 20° to 200° C. Duration: 3.33 h.

Step b) for debonding (elimination of volatile products) and for firing: The heating speeds are:

an average of 110° C./h from 200° to 400° C. (for 1.82 h)

an average of 300° C./h from 400° to 600° C. (for 0.66 h)

Within 2.5 h, between 200° and 600° C., the amount of volatile material eliminated is increased to 94 kg (that is to say 84% of the total volatile material) which corresponds to an average flux $F_m$ of volatile products of 37.6 kg/h with a maximum flux $F_M$ which is less than 45 kg/h. The heating capacity and temperature of the carbonaceous pieces were made to be governed by the debonding speed, in such a way as to obtain the afore-mentioned average flux (37.6 kg/h) over the temperature range of 200°–600° C., without exceeding the maximum flux (45 kg/h), these fluxes being adapted to the carbonaceous products of this test, but being able to vary as a function of the geometric characteristics of the carbonaceous products.

If the temperature is increased to the maximum heating capacity, and without restricting or controlling the flux of volatile materials, then the amount of defective pieces would increase and the quality would become more random.

The flow rate of nitrogen was selected in such a way that the ratio of the "mass of volatile products/mass of nitrogen (said non-oxidizing atmosphere)" is close to 0.85 for step b) for debonding, with, taking into consideration an available section (not occupied by the section of the tubes) of about 2100 cm² inside the cylindrical furnace, an advancing speed in the order of 20 cm/min of the gaseous front in the tubular furnace ("piston" type flow=front which advances substantially perpendicularly to the axis of the cylindrical furnace which is considerably greater in length than in diameter).

Graphiting step: 800° C./h Duration: 2.75 h to pass from 600° to 2800° C.

18 kg of condensable heavy volatile materials were eliminated, particularly between 600° and 1000°.

In all, between 200° and 1000° C., 112 kg of volatile materials were eliminated, that is to say 14% by weight of the initial mass of crude tubes.

Taking into account the cycle as a whole (charging, cooling and discharging), the total duration is slightly less than 24 h. Compare this with 41 days (13+28) in Examples 1 and 2.

In more than 98% of the pieces produced, the tubes obtained are without any physical defects (deformation, rupture, fissures, cracking etc . . . ).

Example 4

This example is similar to Example 3, but it differs from it in that it comprises a densification by CDVP step between the firing step and the graphiting step. During this densification step, sweeping with nitrogen is replaced by sweeping with methane at a pressure of 20 millibar (2 kPa).

Figure 2:
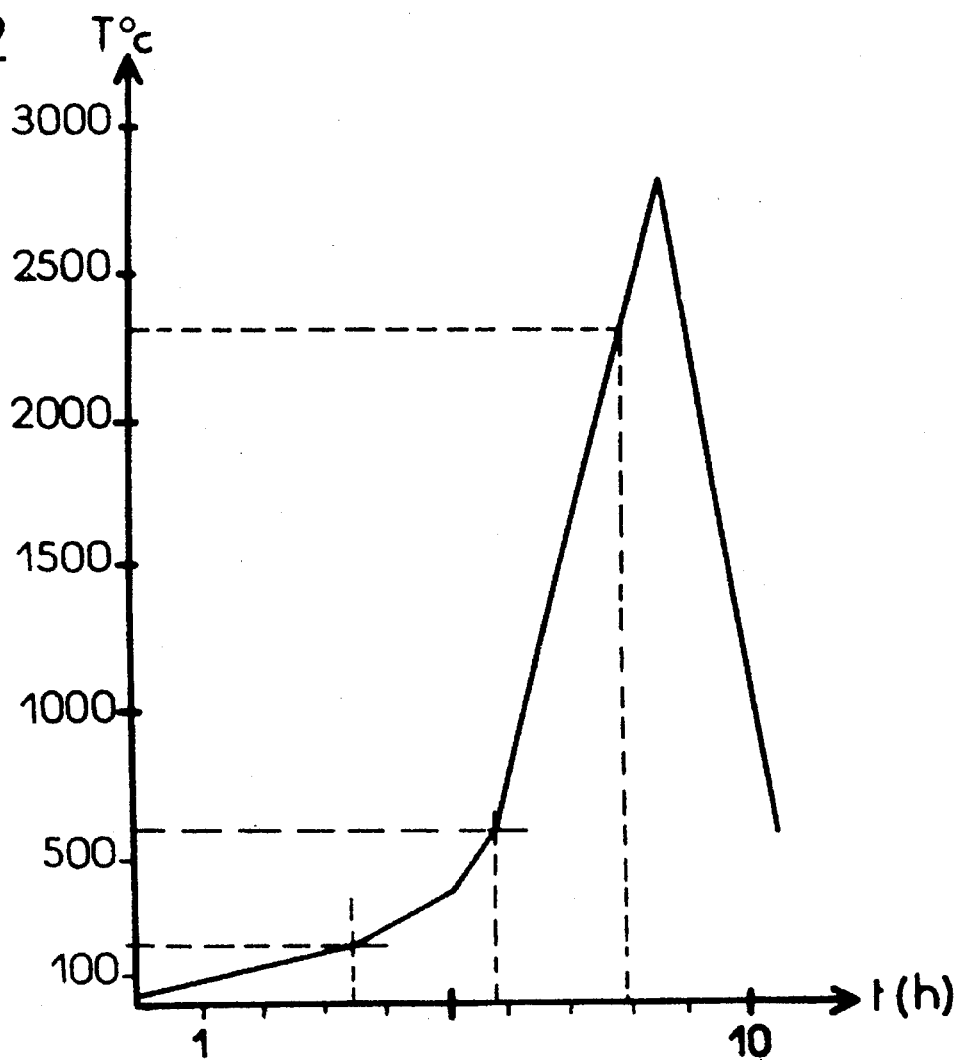
FIG. 2 is a diagram corresponding to a firing and graphiting treatment according to the invention (example 3) and giving the temperature curve as a function of time. The temperature (T°C.) is given on the y-axis and the time (h) is given on the x-axis.

The carbonaceous tubes were subjected to the following heating speeds (see FIG. 2):

Step a): heating speed of 60° C./h to pass from 20° to 200° C. Duration 3.33 h.

Step b): for debonding and firing:

The heating speeds are as follows:

110° C./h from 200° to 400° C. (for 1.82 h)

300° C./h from 400° to 600° C. (for 0.66 h)

800° C./h from 600° to 900° C. (for 0.37 h)

Step for densification by CDVP: 50° C./h Duration: 5 h to pass from 900° C. to 1150° C.

Graphite step: 800° C./h Duration: 2.06 h to pass from 1150° C. to 2800° C.

The total duration, taking into consideration the charging/discharging and cooling operations is close to 24 h.

The tubes obtained are, like those in Example 3, free of any physical defects.

Example 5

In this example, similar to that in Example 3, several tests were carried out by instrumenting crude tubes in such a way as to record the temperature within the tubes during the temperature rise from 20° to 200° C.

By varying the output of the furnace, and no doubt thanks to the circulation of inert gas, several rapid temperature increases were carried out from 20° to 200° C. (internal temperature):

test 5a: increase in 30 mins (that is to say (360° C./h)

test 5b: increase in 1 h (that is to say 180° C./h)

test 5c: rapid increase, in 1 h, from 20° to 160° C. (instead of 200° C.) (temperature within the thickness of the tube), that is to say with an internal heating speed of 140° C./h.

After carrying out the treatment as in Example 3 (in the case of test 5c: increase from 160° C. to 400° C. with a heating speed of 110° C./h as in Example 3), more than 90% of the products produced had physical defects, including a number of ruptures in the tubes.

These tests illustrate the fact that the criterium of the temperature within the carbonaceous pieces which must be reached during the first part of step b) before increasing the heating speed is not significant, as stated in the patent FR 2 153 800.

A test 5d was also carried out which only differs from the test 5c in that the rise from 160° C. to 600° C. was carried out in 1.25 h, in such a way as to reproduce, as recommended in FR 2 153 800, rapid introduction into a furnace at 700° C. of a piece whose internal temperature has already reached 160° C. In this case, carbonaceous pieces were obtained which had a number of defects.

Example 6

This example, according to the invention, is like Example 4, except that there is no graphiting step.

Example 7

This example, according to the invention, is like Example 3, except that there is not graphiting step and the firing operation ceases beyond 600° C. with heating up to 900° C. in 25 mins.

Example 8

This example, according to the invention, is like Example 4, except that it comprises a two-fold CDVP densification: firstly, initial densification which is carried out during the temperature increase to the graphiting temperature (as described in Example 4) and secondly by a second densification which is carried out during cooling of the tubes after graphiting. This complementary densification at about 1150° C. produces a denser material than that obtained in Example 4 which is mainly composed of graphite and a little coarse laminary carbon deposited during the second densification process.

The tubes obtained in Examples 3, 4, 6, 7 and 8 according to the invention are substantially comparable in terms of quality as far as the presence of physical defects is concerned (rupture, fissures, etc . . . ), but they differ by the type of material (carbon or graphite) and its density/porosity:

| MATERIAL of the tubes ("process") | dense | porous |
|---|---|---|
| carbon | example 6 ("abd") | example 7 ("ab") |
| graphite | example 4 ("abdc") | example 3 ("abc") |
| graphite (+ carbon) | example 8 ("abdcd") | |

ADVANTAGES OF THE INVENTION

As already mentioned, the invention has major advantages, economically speaking, over the prior art since:

one single piece of equipment is sufficient whereas the prior art used two or three different pieces of equipment, the labour costs are reduced to a ratio within the order of 1 to 20, the costs of the material are greatly reduced since no basic heating filler is used, the circulation of capital is greatly reduced since there is no longer the need to finance products undergoing manufacture over a period of several months.

the process according to the invention makes it possible to treat practically all crude carbonaceous products, irrespective of their initial pitch content, typically up to 50% by weight, without encountering the problem of the furnace being dirtied or problems with respect to the end quality of the fired carbonaceous products, which shows the polyvalency of the process according to the invention.

Furthermore, the invention makes it possible to obtain, at no extra cost, denser pieces than those typically obtained according to the prior art (process abdcd).

Finally, the invention makes it possible for every order to be dealt with very quickly, and this is a major advantage commercially.

APPLICATION

The means described in the invention are used in manufacturing carbonaceous pieces which are typically shaped by compression or extrusion, these pieces being shaped pieces whose tubes, illustrated in the examples according to the invention, simply give one non-limitative example.

What is claimed is:

1. In a process for manufacturing carbonaceous parts comprising heat shaping a mixture of carbonaceous powder and bonding agent to form raw parts, cooling said raw parts to ambient temperature at a known rate, and firing said cooled raw parts in a furnace from ambient temperature to a final firing temperature of at least 600° C. to release volatile products from said bonding agent, the improvement comprising:

a) placing said cooled raw parts containing about 20 to 50% by weight bonding agent in an electric furnace in the absence of heating filler;

b) heating said raw parts in said electric furnace to an intermediate temperature of about 200° C. at a fixed initial heating rate, the intermediate temperature being selected such that loss of volatile products is less than 10% by weight of total volatile products contained in the raw parts, and said initial heating rate being selected at a rate of less than 100° C./hr, and being inversely dependent on said known rate of cooling such that parts cooled slowly to ambient temperature under an atmosphere at ambient temperature are heated at a rate of 50°–100° C./hr, and parts rapidly cooled in water at ambient temperature are heated at a rate of less than about 5° C./hr, said heating rate thereby freeing internal strain of said cooled parts from said shaping and cooling; and c) heating said raw parts in said electric furnace in the absence of filler from said intermediate temperature to a temperature greater than about 600° C. at a rate greater than said initial heating rate and selected to remove about 5 to 65 wt %/hr of volatile products contained within said parts, said heating to a temperature greater than about 600° C. removing at least about 80% by weight of said volatile products, said heating steps taking place under a flow of non-oxidizing gas through said electric furnace to remove said volatile products from said parts, said gas flow compensating for the loss of the volatile products, and removing the volatile products from the furnace.

2. A process according to claim 1, wherein the furnace is an electrical resistance or induction heating furnace.

3. A process according to claim 2 in which said non-oxidizing gas flow circulates with a gaseous front which advances at least at the speed of 0.5 cm/min.

4. A process according to claim 3, in which said non-oxidizing gas flow is selected from the group consisting of nitrogen, argon and helium.

5. A process according to claim 1, wherein a ratio of mass of volatile products to mass of said non-oxidizing gas is less than 3 surrounding the parts during the heating to said final firing temperature.

6. A process according to claim 1, additionally comprising a step for densification of the fired carbonaceous parts through chemical deposition in vapor phase, said step being carried out in said furnace by cracking a gas with a high carbon content at reduced pressure at temperatures of between 800° and 1200° C., such that dense carbonaceous parts are obtained.

7. A process according to claim 1, additionally comprising a step for graphiting said fired carbonaceous parts, said step being carried out in said furnace, without any heating filler, in a non-oxidizing atmosphere surrounding said fired carbonaceous parts, bringing said fired carbonaceous parts to a temperature of at least 2300° C. at a rate of temperature increase of between 400° C./h and 1900° C./h.

8. A process according to claim 7 wherein said graphiting step is followed by a densification step during cooling in said furnace.

9. A process according to claim 1, wherein said furnace is provided with means to regulate the amount of heating energy provided and to pilot control the temperature of said carbonaceous parts, and means for controlling said gas flow, in such a way as to control the type, pressure and flow of the gaseous atmosphere surrounding said carbonaceous parts, and to thus be able to carry out said process automatically in accordance with given requirements.

10. A process according to claim 9, wherein said furnace is provided with means to measure the loss of volatile products and means for making said gas flow and said heating energy supplied be governed by said flow such that the loss of volatile products is kept at a given rate.

11. A process according to claim 9 wherein said furnace is provided with means for memorizing a temperature curve as a function of time obtained from initial tests, and for providing pilot control of said temperature of said carbonaceous part along said temperature curve, in such a way that the temperature of said carbonaceous part follows said temperature curve with time.

12. A process according to claim 1, wherein the rate of loss of volatile products is between 20 and 40 weight % per hour.

13. A process according to claim 5, wherein the flow of non-oxidizing gas is adjusted according to the rate of volatilization, such that said ratio is constant and about 1.

14. A process according to claim 5, wherein the ratio is less than 1.

15. A process according to claim 3, wherein the front advances at a speed of 5 to 30 cm/min.

16. A process according to claim 1, including the step of measuring the cooling rate.

* * * * *

UNITED STATES PATENT AND TRADEMARK OFFICE
CERTIFICATE OF CORRECTION

PATENT NO. : 5,609,815
DATED : March 11, 1997
INVENTOR(S) : JEAN-MICHEL BAUER

It is certified that error appears in the above-indentified patent and that said Letters Patent is hereby corrected as shown below:

Column 9, line 52, change "3" to --2--.

Column 10, line 44, change "2" to --3--.

Claim 11, line 5, change "part" to --parts--.

Claim 11, line 6, change "part" to --parts--.

Signed and Sealed this

Eighth Day of July, 1997

Attest:

BRUCE LEHMAN

*Attesting Officer*  *Commissioner of Patents and Trademarks*